United States Patent [19]

Abdo

[11] Patent Number: 4,574,887

[45] Date of Patent: Mar. 11, 1986

[54] METHOD FOR PREPARATION OF VISCOUS AQUEOUS LIQUIDS FOR WELLBORE INJECTION

[75] Inventor: Milton K. Abdo, Dallas, Tex.

[73] Assignee: Mobil Oil Corporation, New York, N.Y.

[21] Appl. No.: 651,962

[22] Filed: Sep. 19, 1984

Related U.S. Application Data

[63] Continuation-in-part of Ser. No. 18,692, Mar. 8, 1979, abandoned, which is a continuation of Ser. No. 608,869, Aug. 29, 1975, abandoned, which is a continuation-in-part of Ser. No. 495,385, May 17, 1983, abandoned.

[51] Int. Cl.$^4$ ............................................. E21B 43/22
[52] U.S. Cl. ..................................... 166/275; 166/246; 252/8.55 D; 252/315.3
[58] Field of Search ................ 166/246, 273, 274, 275; 252/8.55 R, 8.55 D, 8.5 A, 8.5 C, 316

[56] References Cited

U.S. PATENT DOCUMENTS

| | | | |
|---|---|---|---|
| 3,243,000 | 3/1966 | Patton et al. ............................ | 175/65 |
| 3,305,016 | 2/1967 | Lindbloom et al. ................. | 166/246 |
| 3,319,715 | 5/1967 | Parks .................... | 252/8.5 C |
| 3,699,042 | 10/1972 | Browning et al. ................. | 252/8.5 C |
| 3,729,460 | 4/1973 | Patton ......................... | 252/8.55 D X |
| 3,757,863 | 9/1973 | Clampitt et al. ..................... | 166/307 |
| 3,773,752 | 11/1973 | Buchanan ................... | 252/8.55 D X |
| 3,801,502 | 4/1974 | Hitzman ......................... | 252/8.55 D |
| 3,858,656 | 1/1975 | Flournoy et al. .................... | 166/274 |
| 3,908,760 | 9/1975 | Clampitt et al. ..................... | 166/308 |
| 4,049,054 | 9/1977 | Wier ................................. | 166/275 X |
| 4,059,154 | 11/1977 | Braden et al. ......................... | 166/274 |
| 4,078,607 | 3/1978 | Carter et al. ........................ | 166/246 |
| 4,104,193 | 8/1978 | Carter et al. ........................ | 252/316 |

OTHER PUBLICATIONS

Deily et al., "New Biopolymer Low-Solids Mud Speeds Drilling Operation", *The Oil and Gas Journal*, vol. 65, No. 26, Jun. 26, 1967, pp. 62-70.
The Condensed Chemical Dictionary, Sixth Edition, p. 1223.
*Hackh's Chemical Dictionary*, Third Edition, p. 752.
*Webster's New International Dictionary*, Second Edition, 1961, p. 2204.

*Primary Examiner*—George A. Suchfield
*Attorney, Agent, or Firm*—Alexander J. McKillop; Michael G. Gilman; Malcolm D. Keen

[57] ABSTRACT

A method of preparing viscous aqueous liquids containing Xanthomonas polysaccharides for injection into wellbores. The Xanthomonas polysaccharide is dispersed into relatively fresh water. This dispersion of polysaccharide is then mixed with a relatively saline aqueous makeup solution to provide the final thickened aqueous liquid. Trivalent metal ions may be incorporated in the polysaccharide dispersion prior to the addition of the aqueous saline solution in order to complex the polysaccharide. The complexed polysaccharide solutions are useful for selectively blocking high permeability regions in stratified reservoir formations by injecting the complexes into the formation at shear rates which cause a reversible disruption of the complex; the disrupted complexes penetrate the high permeability regions and when the shearing forces decrease at a certain distance from the wellbore, the complexes reform to block the high permeability regions selectively.

30 Claims, 11 Drawing Figures

FIG. 3 ALTERATION OF INJECTION PROFILE BY COMPLEXED BIOPOLYMERS

EFFECT OF STRATIFICATION CONTROL - 10-ACRE, NORMAL 5-SPOT WATERFLOOD SIMULATION

AFTER 800 DAYS OF WATERFLOODING:

LAYER 1: 1.1% OF INJECTED WATER; $S_O$ = 64.3%
      2: 93.6% OF INJECTED WATER; $S_O$ = 33.0%
      3: 5.3% OF INJECTED WATER; $S_O$ = 61.0%

1200 DAYS AFTER COMPLEXED BIOPOLYMER TREATMENT

LAYER 1: 7.0% OF INJECTED WATER; $S_O$ = 58.7%
      2: 59.2% OF INJECTED WATER; $S_O$ = 30.0%
      3: 33.7% OF INJECTED WATER; $S_O$ = 45.0%

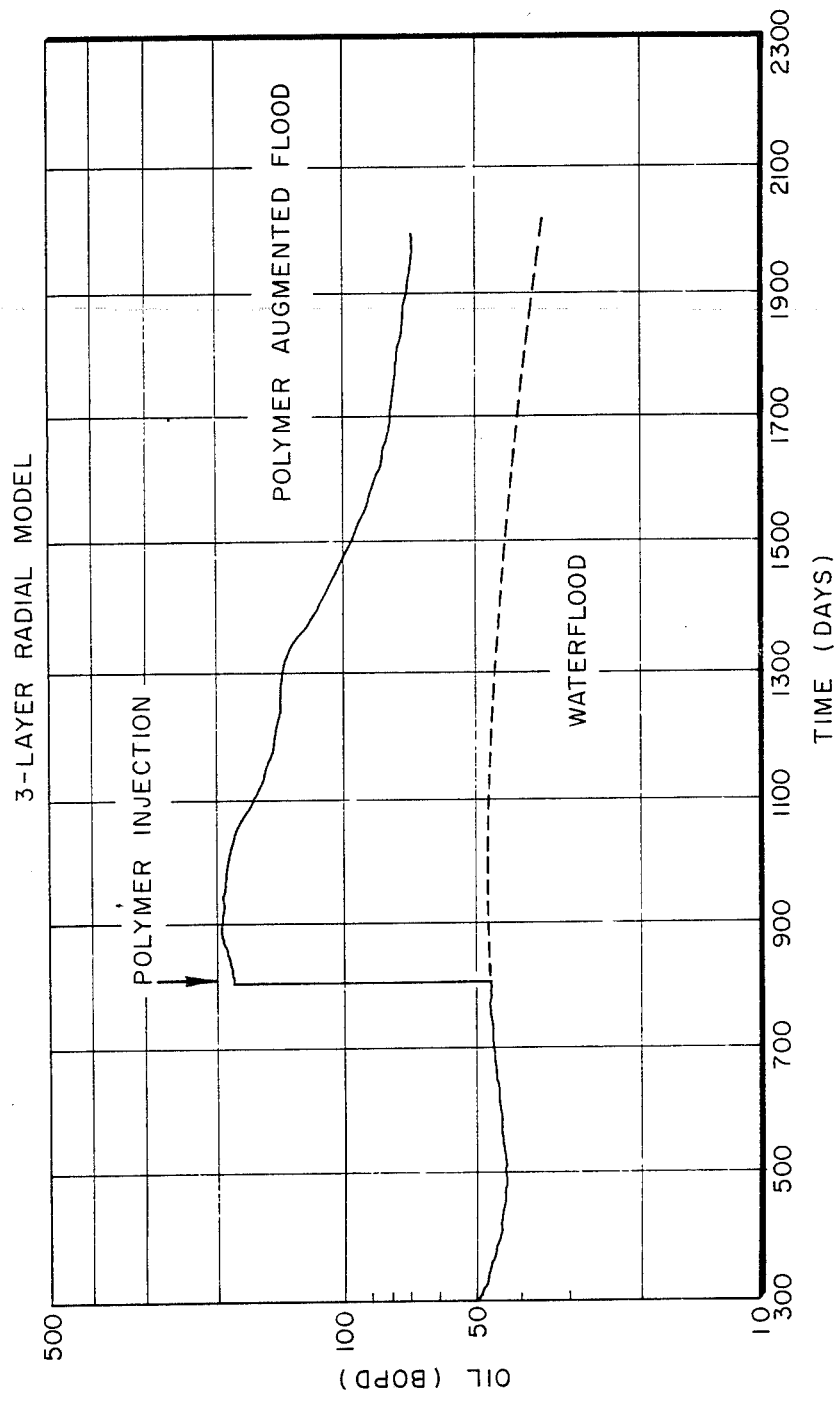
FIG. 5A  OIL PRODUCTION RESPONSE-WATERFLOOD AND POLYMER-AUGMENTED FLOOD IN A NON-COMMUNICATING RESERVOIR

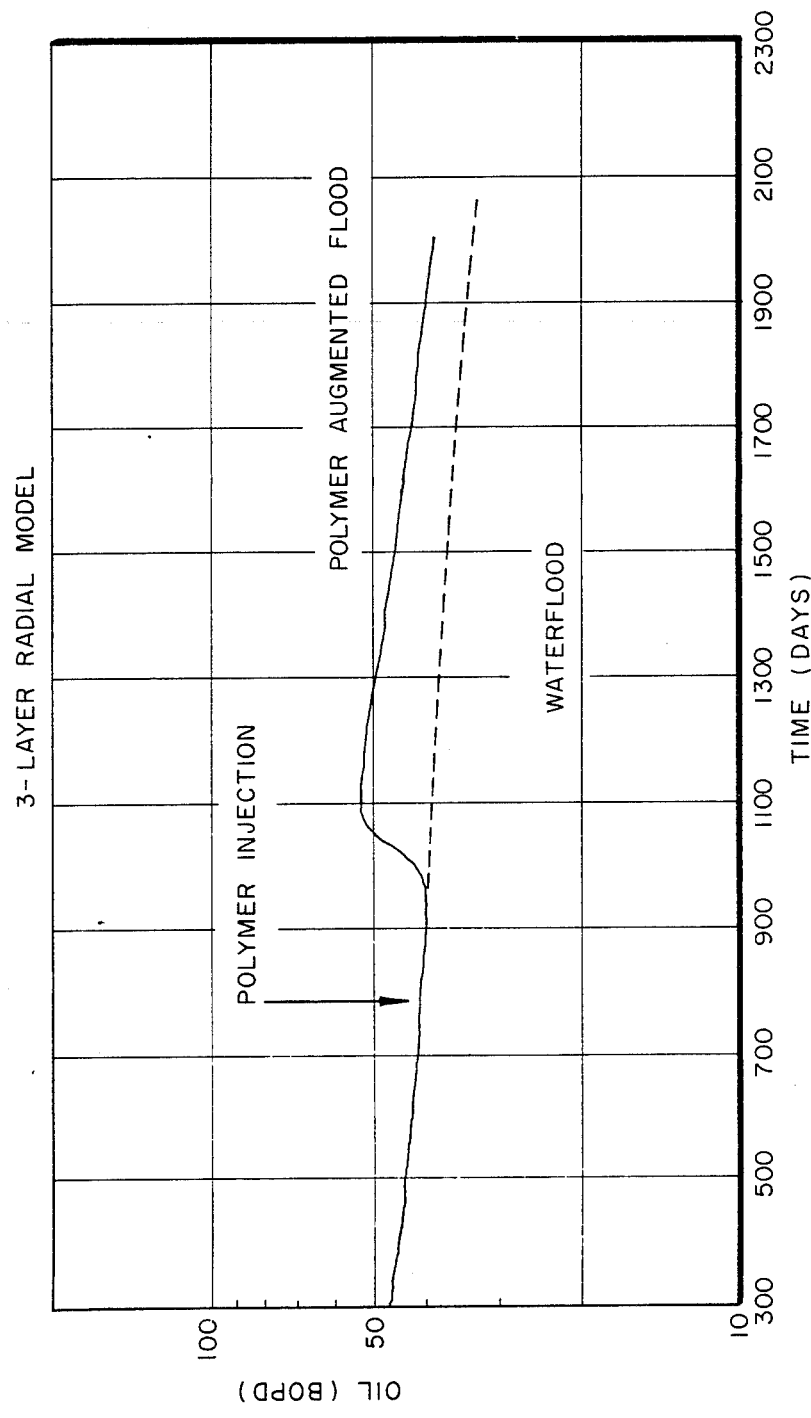
FIG. 5B  OIL PRODUCTION RESPONSE-WATERFLOOD AND POLYMER-AUGMENTED FLOOD IN A NON-COMMUNICATING RESERVOIR

MODEL POLYMERIC FLOODWATER DIVERSION EXPERIMENTS

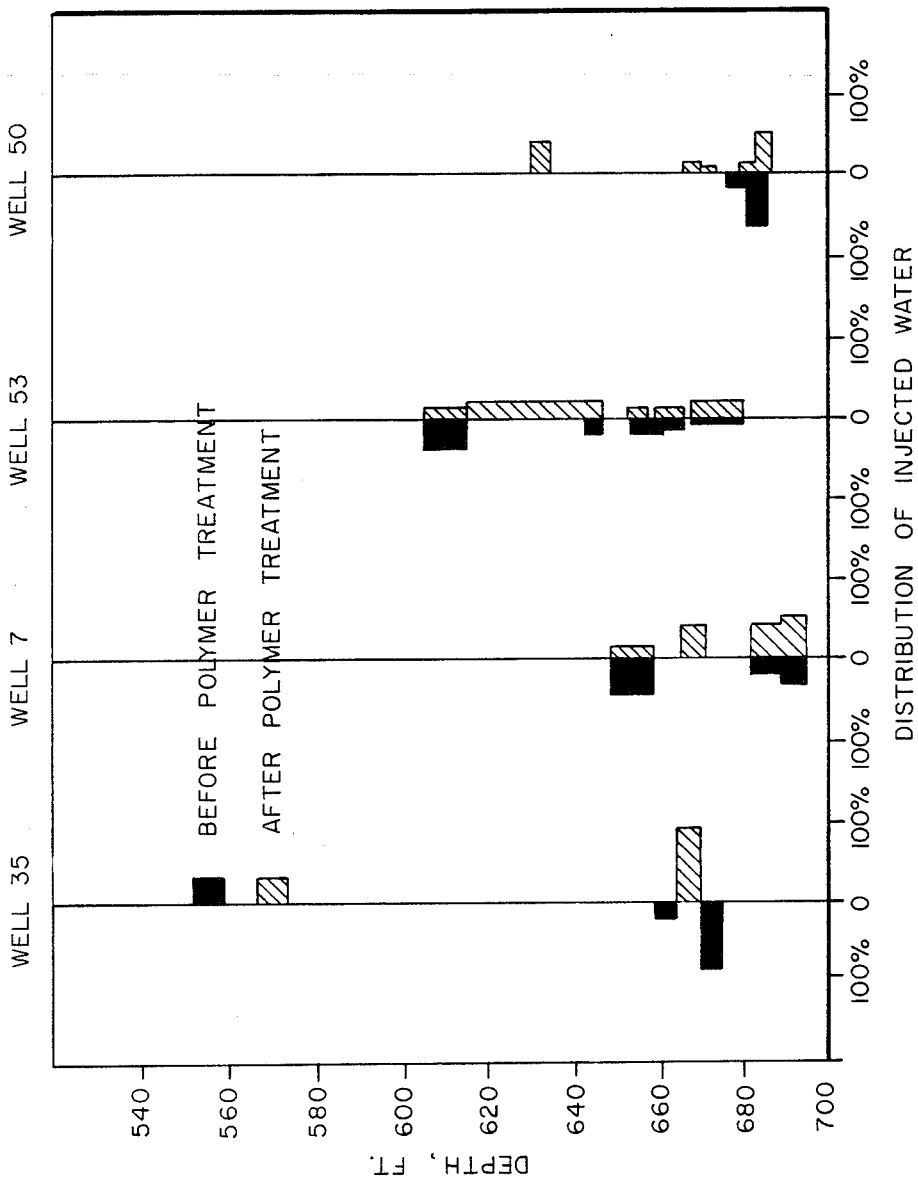

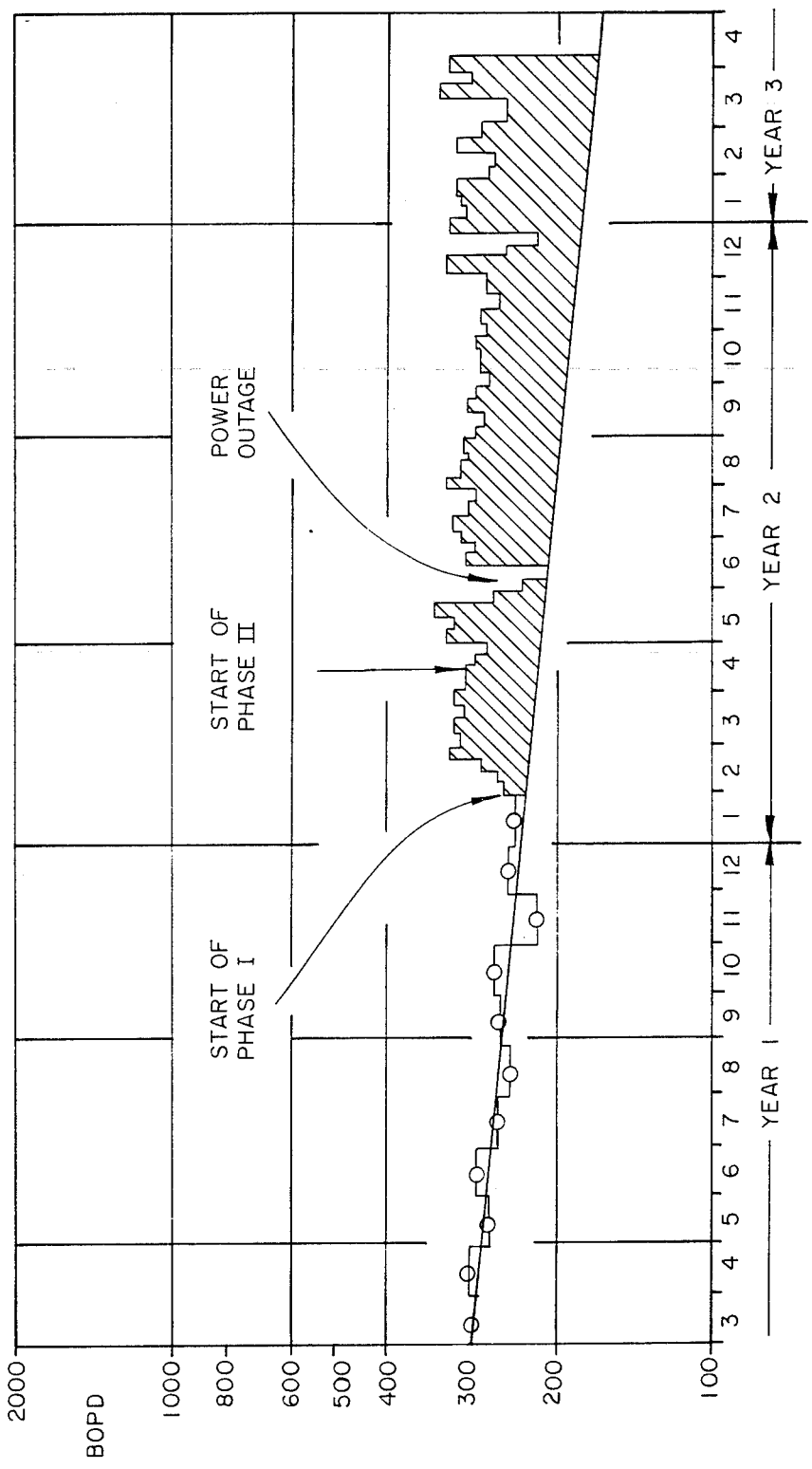

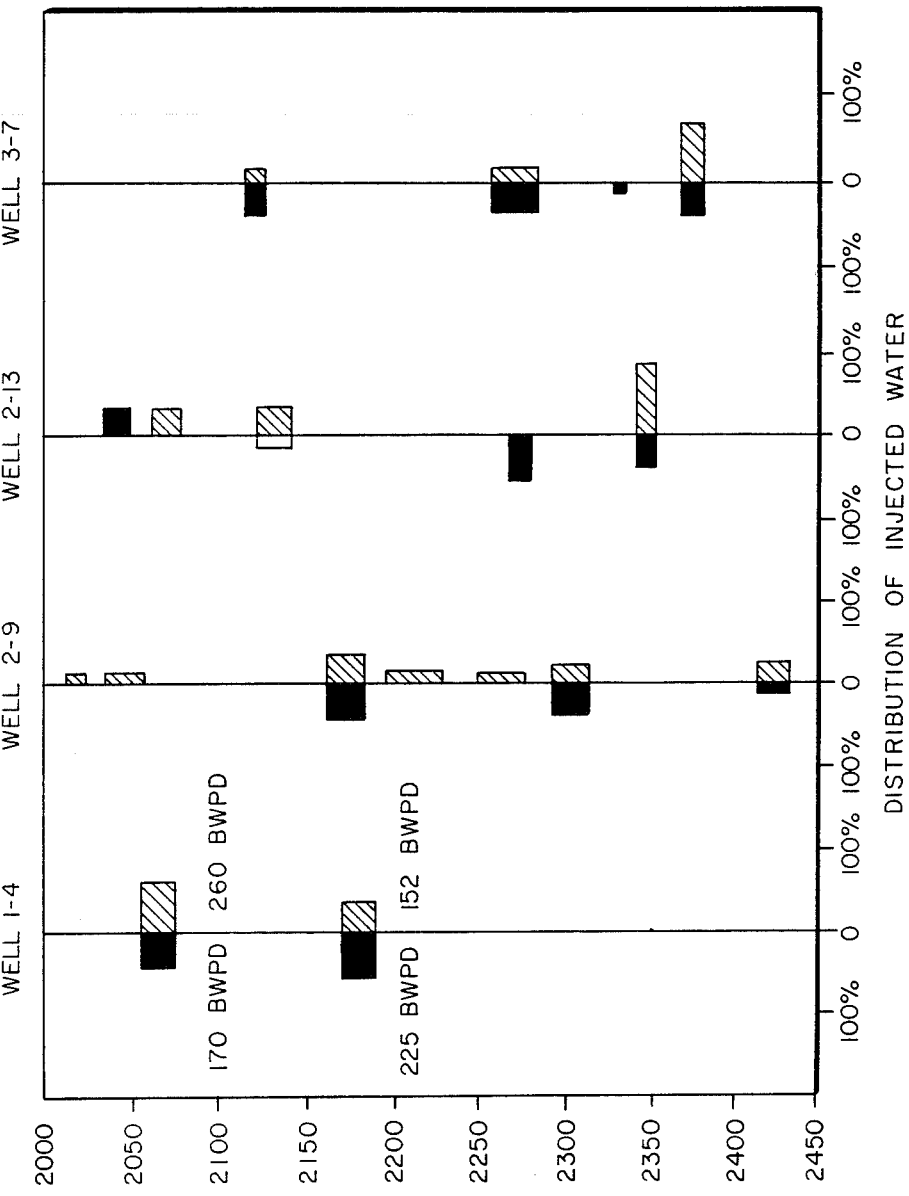

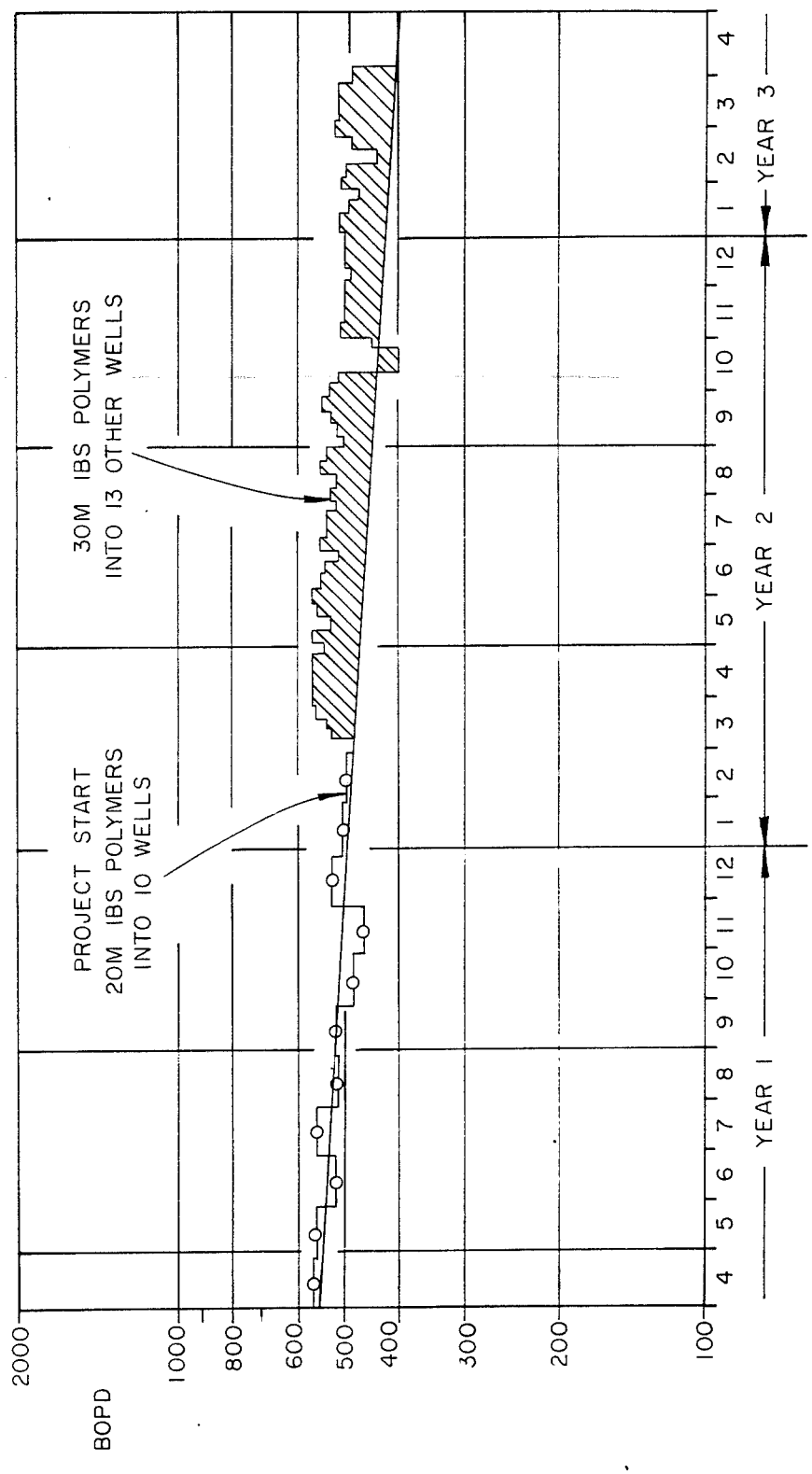

METHOD FOR PREPARATION OF VISCOUS AQUEOUS LIQUIDS FOR WELLBORE INJECTION

CROSS REFERENCE TO RELATED APPLICATIONS

This application is a continuation-in-part of my prior application Ser. No. 18,692, filed Mar. 8, 1979, now abandoned, which, in turn, was a continuation of prior application Ser. No. 608,869, filed Aug. 29, 1975, now abandoned; it is also a continuation-in-part of my prior application Ser. No. 495,385, filed May 17, 1983, now abandoned. The entire disclosures of Ser. Nos. 18,692 and 495,385 are incorporated herein by reference.

FIELD OF THE INVENTION

This invention relates to the preparation of viscous liquids, more particularly viscous aqueous liquids containing polymeric thickening agents, for introduction into wells penetrating the earth. The invention also relates to a method for selectively blocking high permeability strata in stratified reservoirs using such liquids, particularly the complexed polysaccharide thickening agents.

BACKGROUND OF THE INVENTION

Various procedures employed in the petroleum industry involve the introduction of viscous liquids into wellbores. For example, in the production of oil from subterranean oil reservoirs by the waterflooding technique it is a common expedient to add polymeric thickening agents to all or part of the injected water in order to increase its viscosity for mobility and profile control purposes. Other techniques involve the injection of thickened aqueous solutions or gels into formations in order to selectively plug the formation adjacent production or injection wells and thus control the flow of fluids to and from such wells.

Many polymeric thickening agents have been proposed for use in such operations and in many cases the viscosity enhancing values of these polymers may be increased by the addition of trivalent metal ions which act as complexing or crosslinking agents. One well known group of polymers which may be employed either alone or in the presence of complexing agents is the polysaccharides produced by action of the genus Xanthomonas on carbohydrates. For example, U.S. Pat. No. 3,757,863 to Clampitt et al. discloses a process for effecting mobility control and/or plugging of a subterranean formation through the use of such polysaccharides in the presence of polyvalent metal ion crosslinking agents.

Crosslinked polysaccharides are also employed in other operations in which a thickened aqueous liquid is introduced into a wellbore. For example, U.S. Pat. No. 3,243,000 to Patton et al. discloses the use of trivalent ion complexed heteropolysaccharides produced by Xanthomonas bacteria as thickening agents in drilling fluids. Thus, a heteropolysaccharide produced by fermentation of sugar with the bacterium *Xanthomonas campestris* may be complexed by the addition of chromic chloride as a crosslinking agent. The polysaccharide and crosslinking agent may be added to water to effect the desired crosslinking and the resulting solution then mixed with oil under conditions to provide an oil-water emulsion drilling fluid. As recognized in the Patton et al. patent and also in U.S. Pat. No. 3,699,042 to Browning et al. and in Deily et al., "New Biopolymer Low-Solids Mud Speeds Drilling Operation", The Oil and Gas Journal, v. 65, No. 26, pp. 62-70 (June 26, 1967), such complexed polymer solutions exhibit higher viscosities than solutions of similar polymer concentrations without crosslinking.

Clampitt et al U.S. Pat. No. 3,908,760, describes such a proposed polymer flood process where a gelled water-soluble biopolysaccharide produced by the action of bacteria of the genus Xanthomonas on a carbohydrate is injected into a stratified reservoir to form a slug, band or front of gel extending vertically across both high permeability and low permeability strata. This band or front is then driven through the formation by a suitable drive fluid to produce oil adjacent to the flood front. This patent also suggests the use of complexed polysaccharides to block natural or man made fractures in formations.

In an attempt to selectively block high permeability strata of stratified formations, mechanical isolation of the thief zones has been tried. However, vertical communication among reservoir strata often renders such attempts ineffective.

Physical plugging of zones of high flow capacity by cements and solid slurries has also been attempted with varying degrees of success. Note L. R. Smith, C. R. Fast, and O. R. Wagner, "Development and Field Testing of Large Volume Remedial Treatments for Gross Water Channeling," *J. Pet. Tech.*, 1015-1025, August, 1969; J. N. Breston, "Selective Plugging of Waterflood Input Wells, Theory, Methods, and Results," *J. Pet. Tech.*, 26-31, March, 1957; T. M. Garland, "Selective Plugging of Water Injection Wells," *J. Pet. Tech.*, 1550-1560, December 1966; J. O. Robertson, Jr., and F. H. Oefelein, "Plugging Thief Zones in Water Injection Wells," *J. Pet. Tech.*, 999-1004, August, 1967; and W. F. Hower and J. Ramos, "Selective Plugging of Injection Wells by In Situ Reactions," *J. Pet. Tech.*, 17-20, January, 1957. Here, the most serious drawback is the possibility of permanently closing the still oil productive horizons.

From these early experiences, the desirability of designing a viscous slug capable of sealing off the most permeable layers, of slowly moving from injector to producer, and of diverting the trailing floodwater to the underswept, tighter regions of the reservoir, became evident. This consideration led to the use of oil/water emulsions (note C. D. McAuliffe, "Oil-in-Water Emulsions Improve Fluid Flow in Porous Media," SPE 3784, *Symposium on Improved Oil Recovery,* Apr. 16-19, 1972, Tulsa), gels (note L. R. Smith, C. R. Fast, and O. R. Wagner, "Development and Field Testing of Large Volume Remedial Treatments for Gross Water Channeling," *J. Pet. Tech.*, 1015-1025, August, 1969; J. O. Robertson, Jr., and F. H. Oefelein, "Plugging Thief Zones in Water Injection Wells," *J. Pet. Tech.*, 999-1004, August, 1967; R. H. Knapp, M. E. Welbourn, "An Acrylic/Epoxy Emulsion Gel System for Formation Plugging: Laboratory Development and Field Testing for Steam Thief Zone Plugging," SPE 7083, *Symposium on Improved Oil Recovery,* Apr. 16-19, 1978, Tulsa; and B. J. Felber and D. L. Dauben, "Development of Lignosulfonate Gels for Sweep Improvement, SPE 6206, *51st Ann. Fall Tech. Conf. and Exh.*, Oct. 3-6, 1976, New Orleans), and polymers (note W. R. Townsend, S. A. Becker, and C. W. Smith, "Polymer Use in Calcareous Formation," SPE 6382, *Symposium on Im-* proved Oil Recovery, Apr. 16–19, 1978, Tulsa) with polymers being the most extensively applied during the past decade.

Among the polymers so far examined for improving waterflood conformance are polyacrylamides (note J. C. Mack, "Process Technology Improves Oil Recovery," SPE 7179, *SPE Rocky Mountain Regional Meeting*, May 17–19, 1978, Cody, Wyo.; W. G. Routson, M. Neale, and J. R. Penton, "A New Blocking Agent for Water Channeling," SPE 3992, 47*th Ann. Fall Meeting of SPE-AIME*, Oct. 8–11, 1972, San Antonio; D. Sparlin, "An Evaluation of Polyacrylamides for Reducing Water Production," *J. Pet. Tech.*, 906–914, August, 1976; and G. P. Willhite and D. S. Jordan, "Alteration of Permeability in Porous Rocks with Gelled Polymers," 1981 *ACS Meeting*, Aug. 23–28, New York, Polymers Preprints), polysaccharides, carboxymethylcellulose (note R. W. Farley, J. F. Ellebracht, and R. H. Friedman, "Field Test of Self-Conforming Oil Recovery Fluid," SPE 5553, 50*th Ann. Fall Meeting of SPE-AIME*, Sept. 28–Oct. 1, 1975, Dallas) furfural-alcohol and acrylic/epoxy resins (note R. H. Knapp, M. E. Welbourn, "An Acrylic/Epoxy Emulsion Gel System for Formation Plugging: Laboratory Development and Field Testing for Steam Thief Zone Plugging," SPE 7083, *Symposium on Improved Oil Recovery*, Apr. 16–19, 1978, Tulsa; and P. H. Hess, C. O. Clark, C. A. Haskin and T. R. Hall, "Chemical Method for Formation Plugging," *J. Pet. Tech.*, 559–564, May, 1971), WORCON ® (note J. D. Weaver, "A New Water-Oil Ratio Improvement Material," SPE 7574, 53*rd Ann. Fall Tech. Conf. & Exh.*, Oct. 1–3, 1978, Houston) and polyisocyanurate (note C. T. Presley, P. A. Argabright, R. E. Smith, and B. L. Phillips, "A New Approach to Permeability Reduction," SPE 4743, *Symposium on Improved Oil Recovery*, Apr. 22–24, 1974, Tulsa). An overwhelming fraction of the work has been conducted with the polyacrylamides.

Polyacrylamides have been used both in their normal, noncrosslinked form as well as in the form of metal complexes. In either state, the beneficial effects derived from these polyacrylamides seem to dissipate rapidly due to shear degradation during injection and sensitivity to reservoir brines. To overcome these problems and to achieve deeper penetration into the reservoir, dilute solutions of these polymers have sometimes been injected first and then complexed in situ. For example, in one such process, three sequential injection steps are employed: cationic polyacrylamides for strong adsorption and anchoring onto the generally anionic sites of the reservoir rock surfaces, chelation with aluminum ions provided by aluminum citrate or with chromium ions generated by the in situ reduction of $Cr_2O_7^=$ (note J. E. Hassert, and P. D. Flemming, III, "Gelled Polymer Technology for Control of Water in Injection and Production Wells," 3*rd Conference on Tertiary Oil Recovery*, U. of Kansas, Lawrence, 1979), and finally anionic polyacrylamides for the formation of the desired cationic polymer-metal ion-anionic polymer complexes. Recent field trails have shown these processes to have promise for enhanced oil recovery by injection profile control.

Like the polyacrylamides, polysaccharides may function as effective mobility improvement agents in waterflooding. They can also be complexed with multivalent cations in an attempt to provide highly viscous solutions, e.g., for stratification control and for floodwater diversion.

SUMMARY OF THE INVENTION

The present invention provides a method for preparing a viscous liquid for introduction into a wellbore by employing a polymeric thickening agent in a saline environment. The polymeric thickening agents which are used in the method are water-dispersible polysaccharides produced by action of bacteria of the genus Xanthomonas on a carbohydrate. Use of this method tends to promote complete hydration of the polysaccharide nolecule and thus is capable of enhancing the viscosity of the final aqueous liquid relative to the amount of polysaccharide present.

In carrying out the preparation of the viscous liquid, a water-dispersible polysaccharide produced by action of bacteria of the genus Xanthomonas on a carbohydrate is incorporated into an aqueous liquid. Preferably the polysaccharide is incorporated into a relatively fresh aqueous liquid which exhibits a salinity within the range of zero to 0.03 weight percent. Subsequent to addition of the polysaccharide, an aqueous saline solution is added to the initial aqueous liquid in order to increase its salinity.

The term "salinity" is used in this specification, including the appended claims, to mean the total dissolved salts content of the aqueous medium in weight-volume percent. In most cases, sodium chloride will be the predominant salt present although the aqueous medium may contain other monovalent salts and also appreciable amounts of divalent metal salts such as calcium and magnesium chlorides.

In a preferred embodiment of the invention, this order of addition is employed to produce a complexed polymeric dispersion in an aqueous saline medium. Thus in addition to adding the polysaccharide to the initial aqueous liquid, trivalent metal ions are incorporated into the liquid in an amount sufficient to effect complexing of the polysaccharide. An aqueous saline solution is then added to the initial aqueous liquid containing the polysaccharide and the trivalent metal ions. Preferably the aqueous saline solution added to the dispersion of polysaccharide and trivalent ions exhibits a salinity sufficient to provide a final salinity for injection purposes of at least 0.5 weight percent. A preferred polysaccharide for use in the present invention is the polysaccharide produced by action of the bacterium *Xanthomonas campestris*. Trivalent ions of chromium are preferred to effect complexing of the polysaccharide.

Complexing the polysaccharides in this way significantly enhances the viscosity yield.

THE DRAWINGS

FIG. 5A shows the oil production response resulting from a waterflood and a polymer-augmented flood in a reservoir with negligible vertical permeability according to a simulation study discussed in Example 1.

FIG. 5B shows the oil production response resulting from a waterflood and a polymer augmented flood in a reservoir with significant vertical permeability according to a simulation study described in Example 1.

FIG. 7 shows radioactive profile logs of injectors in the field study discussed in Example 2.

FIG. 8 shows the oil production response to polymer injection in the field test of Example 2.

FIG. 9 shows the profile logs of injectors in the field study discussed in Example 3.

FIG. 10 shows oil production response to polymer injection in the field test of Example 3.

DETAILED DESCRIPTION

Figure 1:
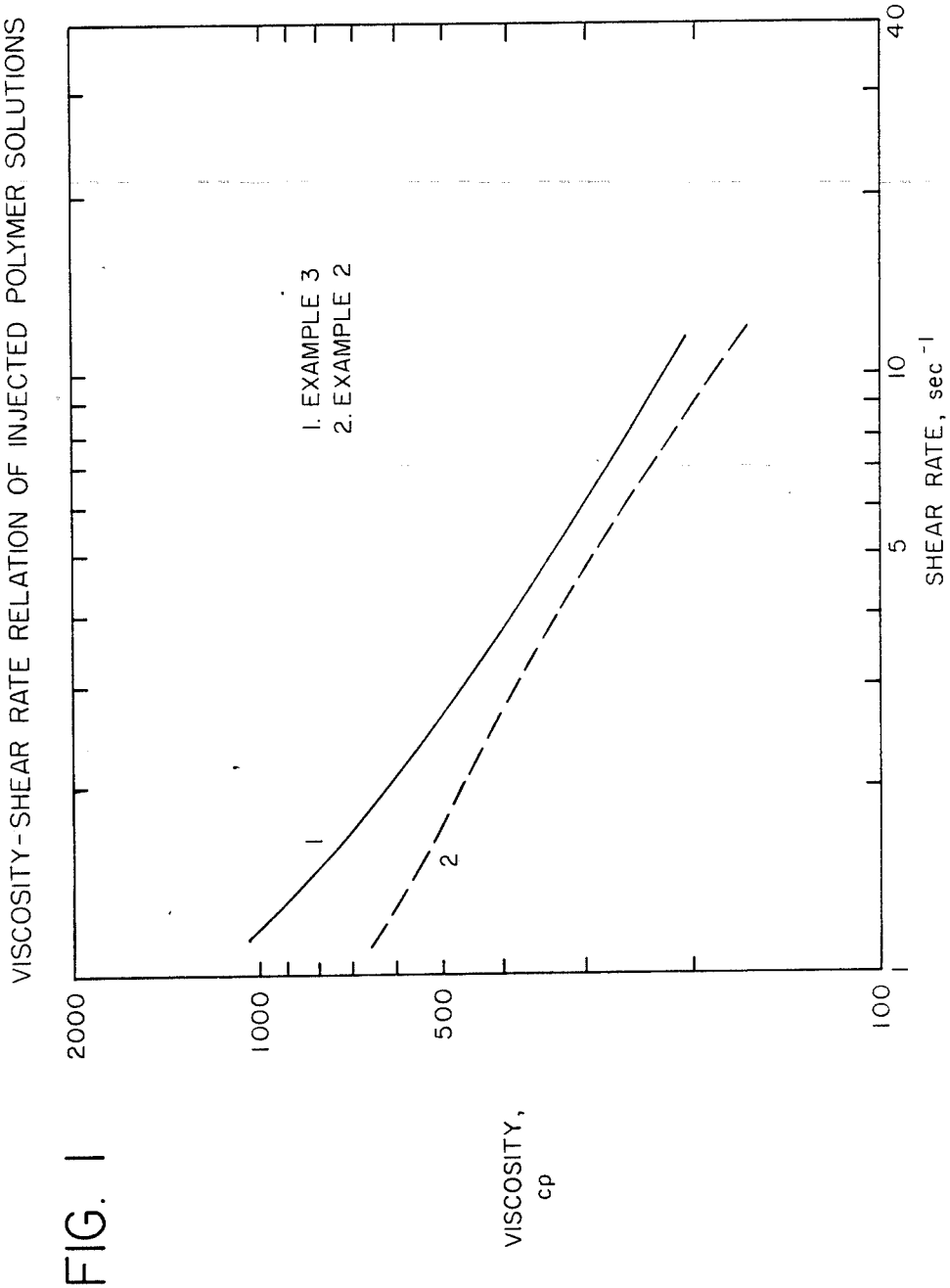
FIG. 1 is a graph showing the viscosity-shear rate relation of injected polymer solutions according to Examples 2 and 3.
Figure 2:
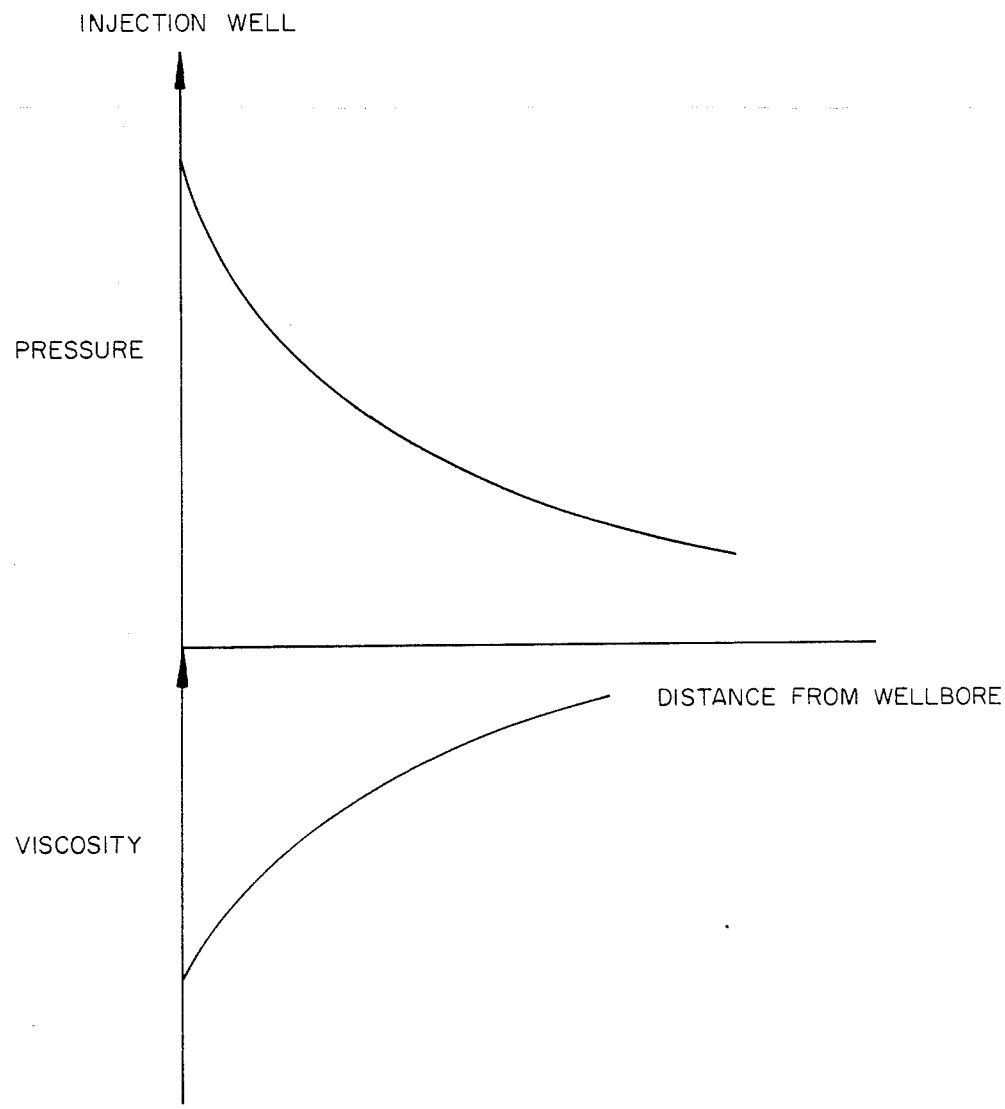
FIG. 2 is a dual graph showing field pressure and viscosity distribution as a function of distance from the wellbore.
Figure 3:
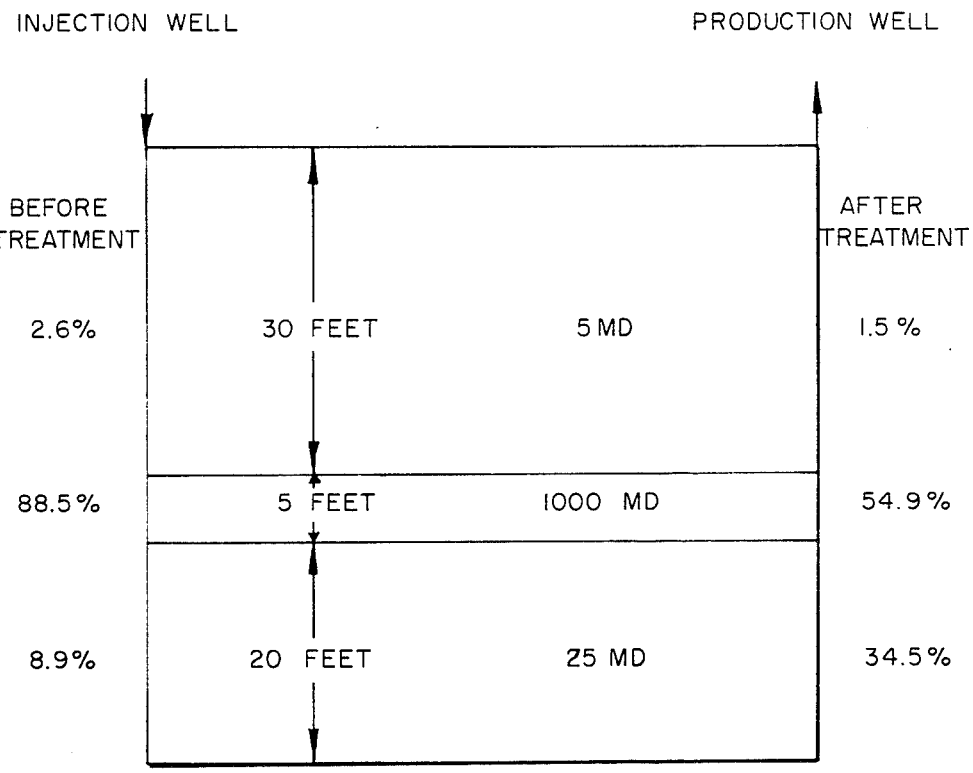
FIG. 3 shows the alteration of injection profile by complexed biopolymers according to a simulation study discussed in Example 1.
Figure 4:
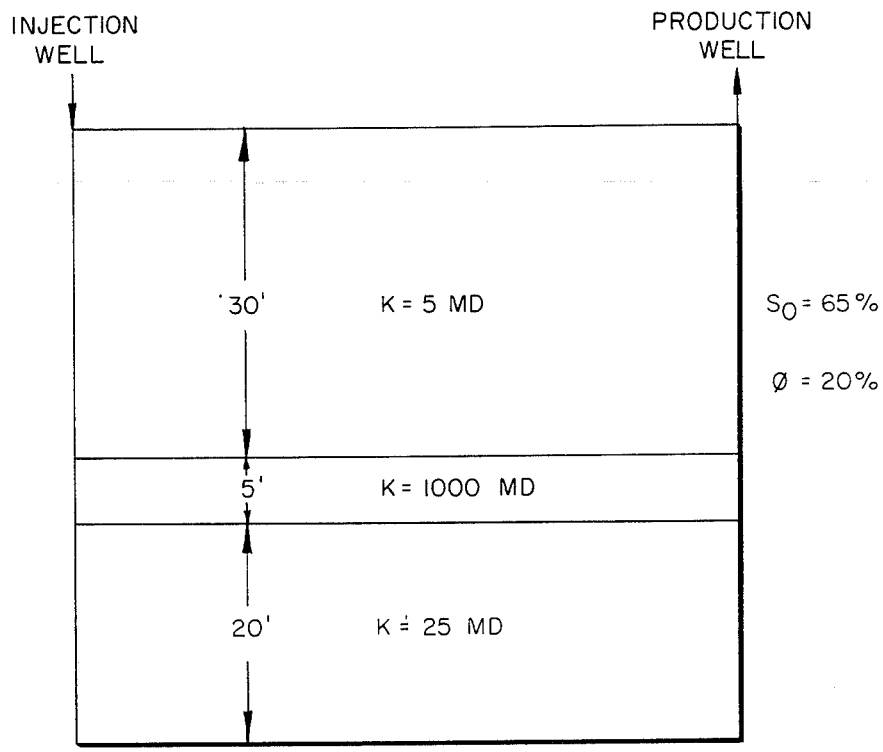
FIG. 4 shows the effect of stratification control according to a 10-acre, normal 5-spot waterflood simulation discussed in Example 1.

The polysaccharide used in accordance with the present invention is preferably a water-soluble biopolysaccharide produced by the action of bacteria of the genus Xanthomonas on a carbohydrate. Xanthomonas polysaccharides, their methods of preparation and their use in various applications in the petroleum industry are well known to those skilled in the art, as disclosed, for example, in the Lindblom et al U.S. Pat. No. 3,305,016 and in the Patton et al U.S. Pat. No. 3,243,000, the entire disclosures of which are incorporated herein by reference. Representative species of the genus Xanthomonas which may be employed to produce polysaccharides include *Xanthomonas begoniae, Xanthomonas campestris, Xanthomonas carotae, Xanthomonas corylina, Xanthomonas gummisudans, Xanthomonas hederae, Xanthomonas incanae, Xanthomonas lespedezae, Xanthomonas malvacearum, Xanthomonas holcicola, Xanthomonas papavericola, Xanthomonas phaseoli, Xanthomonas pisi, Xanthomonas translucens, Xanthomonas vasculorum,* and *Xanthomonas vesicatoria.* A particular polysaccharide which is commercially available and is preferred for use in the present invention is the ionic polysaccharide B-1459 produced by fermentation of glucose with the bacterium *Xanthomonas campestris* NRRL B-1459, U.S. Department of Agriculture. This polysaccharide is produced by culturing the bacterium *Xanthomonas campestris* in a well aerated medium having a pH of about 7 which contains commercial glucose, organic nitrogen sources, dipotassium hydrogen phosphate and appropriate trace elements. This polymer is available from the Kelco Chemical Company under trade name "Kelzan", as well as from other commercial sources.

In many oil field applications, the Xanthomonas polysaccharide is employed with or without the addition of complexing agent in water containing relatively high concentrations of dissolved salts. In some instances this is due to the fact that the water available at the well site is an oil field brine which may exhibit a salinity as high as 21 weight percent. In other cases it may be desirable to adjust the salinity of the thickened aqueous liquid containing the polymeric thickening agent. For example, in enhanced oil recovery applications involving the injection of surfactants, a thickened aqueous slug is usually employed for mobility control purposes. In many cases the salinity of the thickened aqueous slug is maintained within a prescribed range consistent with the optimum oil-water interfacial tension and the efficient movement of the surfactants and other solutes through the reservoir by a chromatographic transport mechanism.

The phenomenon of complexing or crosslinking such polysaccharides in order to increase their viscosity enhancing power is well known to those skilled in the art. For a further description of this phenomenon, reference is made to the aforementioned patents to Patton et al. and Browning et al. Trivalent ions of aluminum, chromium, and iron have heretofore been employed in the prior art as crosslinking agents for Xanthomonas polysaccharides and such trivalent metal ions may be used in carrying out the present invention. A particularly suitable crosslinking agent is the trivalent chromium ion. The use of this material is discussed in the aforementioned patents to Patton et al. and to Browning et al. The chromium ions may be supplied to the aqueous solution by the chromic chloride ($CrCl_3 \cdot 6H_2O$) compound. Optionally, however, chromium may be supplied in a hexavalent state and may be reduced in situ by the method described in the Clampitt et al. U.S. Pat. No. 3,908,760, to which reference is made for details of the method. Examples of other polyvalent metals which may be used include trivalent aluminum and trivalent iron.

The improved process in accordance with the present invention of incorporating a crosslinked Xanthomonas polysaccharide into an aqueous saline solution comprises incorporating the Xanthomonas polysaccharide and the crosslinking agent into an aqueous liquid which initially exhibits a salinity significantly less than that of the final product. Preferably the aqueous liquid is relatively fresh water having a salinity no greater than 0.03 weight percent. If available, distilled water which usually will contain only a few parts per million of dissolved salts may be employed in this step. Subsequent to addition of the polysaccharide and the crosslinking agent, a relatively saline aqueous solution is then mixed with the aqueous liquid containing the polysaccharide and trivalent ion complexing agent in order to increase the salinity of the aqueous dispersion of complexed polysaccharide. By employing this technique of first dispersing the polysaccharide and complexing agent in relatively fresh water and then increasing the salinity thereof by adding the relatively high salinity makeup solution, the final product exhibits a higher viscosity for a given polysaccharide and trivalent ion concentration than is the case where the polysaccharide and trivalent ions are incorporated directly into a relatively saline medium. More specifically, this order of steps enables the attainment of a two- to fourfold increase in viscosity by complexing with a relatively low trivalent ion concentration.

The polysaccharide and complexing agent may be added to the aqueous liquid in any suitable amounts depending upon the concentrations of these agents desired in the final product and the relative proportions of initial aqueous liquid and saline solution which are mixed together to form the final product. Normally, the polysaccharide is added to the initial aqueous liquid in an amount to provide a concentration in the final product (after dilution with the saline solution) within the range of 0.05–1.0 weight percent. The corresponding trivalent metal ion concentration (in the final product after dilution with the saline solution) preferably is no greater than 25 parts per million and normally will fall within the range of 4–25 ppm. This upper limit is particularly significant where the salinity of the final product is to be in excess of 6 weight percent since higher trivalent metal ion concentrations may lead to polymer precipitation.

While the trivalent metal ions may be added to the initial aqueous liquid prior to the polysaccharide, it is preferred to add the complexing agent subsequent to the polysaccharide. This order of addition tends to promote complete hydration of the polysaccharide molecule and thus ultimately enhances the viscosity of the final product.

It is preferred to incorporate the complexing agent into the aqueous medium by mixing in a concentrated solution of the complexing agent with the polysaccharide dispersion. For example, to provide a chromium ion concentration of 50 parts per million in the initial aqueous dispersion of polysaccharide, the chromium ion may be added from a solution containing 2,000 parts per million of chromium ion in a ratio of 1 part chromium solution for every 39 parts of the aqueous polysaccharide dispersion. This technique avoids the occurrence of locally high concentrations of trivalent metal ions which may cause polymer precipitation.

In a preferred embodiment of the present invention, the initial polysaccharide dispersion is subjected to shearing prior to addition of the complexing agent. This may be accomplished by passing the initial relatively fresh water dispersion of polysaccharide through shear plates and adding the concentrated solution of complexing agent to the dispersion immediately downstream of the shear plates. Preferably the initial polysaccharide dispersion is sheared at velocities which are at least in the lower range of the turbulent flow regime, at a Reynolds number of at least 3,000, in order to disperse the polysaccharide effectively through the aqueous medium.

As is well known to those skilled in the art, it is a common practice to employ a biocide to retard biodegradation of biopolymers such as Xanthomonas polysaccharides and it is preferred to employ a biocide in carrying out the present invention. The biocide should be added to the initial aqueous dispersion of polysaccharide (subsequent to the addition of polysaccharide, but prior to the addition of the saline solution) and may be added either before or after the addition of the complexing agent, depending upon the pH and the salinity conditions. For salinities on the order of 6 weight percent and greater, the pH should not exceed about 7.5 in order to avoid precipitation of the polysaccharide. Since the commonly employed biocides tend to increase the pH of the solution, it usually will be preferred to add the biocide after addition of a complexing agent such as chromium ion which tends to decrease the pH. Such biocides are well known to those skilled in the art and include materials such as formaldehyde, paraformaldehyde, and chlorinated aromatic compounds. A suitable biocide for use in the invention is sodium trichlorophenylate which is available from the Dow Chemical Company under the trade name "Dowicide B". The biocide may be added in any suitable amount, normally within the range of 25 to 100 ppm with 50 ppm as the preferred amount.

As noted previously, it is preferred that the aqueous medium in which the polysaccharide is initially dispersed exhibit a salinity within the range of zero to 0.03 weight percent. The amount of saline solution added as makeup to form the final product will depend upon the salinity of the makeup solution and also upon the desired salinity of the final product. Normally the dispersion of complexed polysaccharide introduced into the well will exhibit a salinity of at least 0.5 weight percent.

While the invention has been described thus far with particular reference to the production of complexed polysaccharide dispersions, this same order of addition may be employed to produce saline dispersions of polysaccharide even though a complexing agent is not added. In this case, as well as in the preferred embodiment in which trivalent ions are added, the viscosity of the final polysaccharide dispersion is significantly greater than that obtained by adding the polysaccharide directly to a saline solution. In this regard, Table I shows the results of comparative laboratory experiments illustrating the effect of the order of addition of Kelzan on the final product viscosity without the use of complexing agent.

TABLE I

| Shear Rate, sec$^{-1}$ | Viscosity, cp. | | |
|---|---|---|---|
| 1 | 2 | 3 | 4 |
| 0.37 | 60 | 154 | 300 |
| 0.74 | 50 | 118 | 210 |
| 1.85 | 38 | 78 | 132 |
| 3.7 | 30 | 55 | 90 |
| 7.4 | 23 | 38 | 59 |
| 14.8 | 17 | 27 | 38 |
| 37 | 11.6 | 16 | >20 |
| 74 | 8.6 | >10 | — |

In Table I, column 1 sets forth the shear rates in reciprocal seconds at which the viscosity measurements were taken. Column 2 shows the viscosities observed for a 1000 ppm Kelzan solution in water containing 1 weight percent sodium chloride with the Kelzan added directly to the sodium chloride solution. Column 3 illustrates the viscosities observed for experiments simulating the practice of the present invention in which the Kelzan was added first to distilled water with sodium chloride solution added subsequently to provide a final salinity of 1 weight percent sodium chloride. Column 4 shows the viscosities observed for the case in which Kelzan was added to distilled water without the subsequent addition of salt. In each case the Kelzan concentration was 1000 parts per million and the measurements were taken at 25° C. using a Brookfield viscometer equipped with a UL adapter. As can be seen from examination of Table I, at each of the shear rates reported, the viscosities set forth in column 3 are significantly greater than those in column 2. At shear rates of 1.85 sec$^{-1}$ or lower, more than a twofold increase in viscosity was observed by first dispersing the Kelzan in distilled water and then increasing the salinity thereof over that obtained by adding the Kelzan directly to the saline solution.

As is taught in the prior art, it usually is desirable to adjust the pH of the complexed polysaccharide dispersion within prescribed limits in order to increase the viscosity of the final product. For example, the aforementioned patent to Patton et al. suggests that an alkaline agent such as sodium hydroxide may be added in an amount to provide a pH between about 7 and about 8. This patent cautions against a pH in excess of 11 in the presence of a high calcium ion concentration which may lead to precipitation of the polymer. The aforementioned patent to Browning et al. discloses that after the addition of the crosslinking agent the pH of the solution should be adjusted to a range between about 6 and about 7 and mechanically stirred to prevent a localized high pH condition. After initial mixing, the pH of the aqueous solution may be adjusted up to about 11.

In the present invention an alkaline agent may be added by mixing a relatively concentrated aqueous solution of the alkaline agent with the dispersion of polysaccharide and complexing agent. The alkaline agent is added in this manner rather than in solid form in order to avoid local changes to high pH levels which may cause precipitation of the polymer. The alkaline agent, if employed, preferably is added prior to mixing of the polysaccharide solution with the saline solution. By using this order of addition, the pH may be increased to a value which will result in an ultimate pH (after mixing with the makeup solution) near that of the reservoir. The pH can be increased in this step to alkaline levels to promote complexing of the polymer without precipitation. Suitable alkaline agents which may be employed in this step include alkali metal and ammonium hydroxides and alkali metal carbonates and bicarbonates.

If the pH of the initial polysaccharide dispersion is increased by the addition of an alkaline agent, it normally will be decreased to a value near neutral when the makeup solution is added to arrive at the final product. In most cases, the pH of the final product should be within the range of about 5 to 8. This is particularly significant if the salinity of the final product is above about 6 weight percent in which case the pH should be within the range of 5–7.5. If the salinity is below this level, the pH of the final product can exceed 7.5 but normally should still be no greater than 8.

Turning now to Table II, this table illustrates the effect of the order of addition of Kelzan with and without complexing agent to a relatively high salinity system.

TABLE II

| Shear Rate, $sec^{-1}$ | Viscosity, cp. | | | |
|---|---|---|---|---|
| 1 | 2 | 3 | 4 | 5 |
| .37 | 242 | 730 | 560 | 1810 |
| .74 | 167 | 511 | 435 | >1000 |
| 1.85 | 124 | 307 | 262 | — |
| 3.7 | 95 | — | 176 | — |

In this table, column 1 sets forth the shear rates in reciprocal seconds at which the viscosity measurements were taken. Columns 2 and 3 show the viscosities observed for a 2000 parts per million Kelzan solution in an oil field brine containing about 13 weight percent total dissolved solids and exhibiting a pH of about 6.2. Column 2 illustrates the case of uncomplexed Kelzan. Column 3 illustrates the case of employing 20 parts per million chromium ion.

Columns 4 and 5 show the results of tests simulating the practice of the present invention in which Kelzan, with and without complexing agent, was added first to fresh water and then mixed with the field water employed in the experiments reported in columns 2 and 3. Thus, in column 4, 6700 parts per million of Kelzan was dispersed in a relatively fresh creek water exhibiting a total dissolved solids content of about 300 parts per million. This Kelzan dispersion was then mixed with the field water in proportions of 3 parts fresh water Kelzan dispersion with 7 parts field water to provide a final Kelzan concentration of 2010 parts per million. A complexing agent was not employed in the test reported in column 4.

In the experiment reported in column 5, a similar order of addition was employed except that in this case chromium ion was employed as a complexing agent. Thus after the addition of Kelzan to the fresh water, chromic chloride was added to the fresh water in an amount to provide a chromium ion concentration of 67 parts per million. The fresh water containing the Kelzan and chromium ion was then mixed with the field water in the same proportions described previously to provide a final Kelzan concentration of 2010 parts per million and a final chromium ion concentration of 20 parts per million. In the experiment of column 5, sodium hydroxide was added subsequent to the addition of the chromium ion but prior to mixing with the field brine to provide a final pH of 6.36. Sodium hydroxide was also used for pH adjustment in the experiment reported in column 3 to provide a final solution pH of 6.32. The pH of the systems reported on in columns 2 and 4 were 6.3 and 6.4, respectively. From an examination of the data presented in Table II, it can be seen that the final product viscosities observed by following the order of addition of the present invention both with and without the presence of complexing agent were significantly higher than those obtained by adding the Kelzan directly to the relatively high salinity field water.

The complexed polysaccharides are especially useful for selectively blocking high permeability, essentially non-fractured strata in stratified reservoirs. When used for this purpose, the permeability-reducing complexed polysaccharides are selectively placed in the high permeability stratum or strata of the stratified formations by first complexing the polysaccharide with a polyvalent metal by combining the polysaccharide, the polyvalent metal and water in a manner such that a viscous liquid is formed; and then injecting the viscous liquid through an injector into the formation at a rate above the rate at which the formation could accept the liquid if the apparent viscosity of the liquid was maintained. When this is done, the complex is sheared as the liquid leaves the injector and enters the formation, and this reversibly disrupts the complex to the extent that the apparent viscosity of the liquid is reduced; subsequently, the complex is selectively reformed in the high permeability stratum or strata at a point sufficiently far away from the injector that the shearing forces are sufficiently small to permit the reforming to take place.

The selective placement of the complexed polysaccharide in the high permeability regions of the formation may be used to advantage in the recovery of oil by water flooding in stratified oil-producing formations. The complexed polysaccharide is injected, as described above, in the form of the viscous liquid through the injector(s) so that the complex is sheared as it enters the formation (if necessary, the waterflooding operation is interrupted for this to take place). The complex then undergoes the reversible disruption-reforming sequence described above in which it re-forms selectively in the high permeability regions of the formation remote from the injector. Subsequently, when the waterflooding is resumed, the injected water is diverted from the high permeability stratum or strata by the re-formed, complexed biopolymer to the low permeability stratum or strata.

The viscous liquid which is injected to block the high permeability stratum or strata may, in its preferred form of the chromium-complexed Xanthomonas polysaccharide, contain from about 1000 to about 4000 ppm of Xanthomonas polysaccharide and from about 10 to 100 ppm of $Cr^{3+}$. The extent of viscosity increase is, of course, a function of both polysaccharide and chromium ion concentration. A preferred narrower range is from 1500 to 3000 ppm of Xanthomonas polysaccharide per from about 10 to 50 ppm of $Cr^{3+}$. For example, about 2000 ppm of Xanthomonas polysaccharide may be complexed with from about 10 to about 30 ppm of $Cr^{3+}$. The viscosity and size of the slug to be selected for field application depend, of course, on reservoir and fluid properties, the degree of stratification, the extent of multi-zonal injection and commingled production, variation and symmetry of well spacing, and oil/water mobility ratio. In general, the amount of viscous liquid which may be injected into the stratified formation may be, e.g., from about 10% to about 100% of the pore volume of the high permeability stratum or strata.

The viscous, complexed polysaccharide containing liquid which is injected into the stratified formation, is capable of undergoing a reversible shear-thinning effect. More particularly, this liquid may have a viscosity of at least 400 cp or even at least about 500 cp at a temperature of about 25° C. and a shear rate of 2 $sec^{-1}$. However, when the same liquid is subjected to a shear rate of 10 $sec^{-1}$ at the same temperature, a viscosity reduction of at least 50% or even at least about 60% may be observed. For example, the viscosity observed at 10 $sec^{-1}$ under these conditions may be about 200 cp or less. After being subjected to this higher shearing rate, the viscous liquid will again show the initial high viscosity when measured a second time at 2 $sec^{-1}$.

The complexed polysaccharides are capable of maintaining high viscosity in relatively high salinity environments with respect to the presence of divalent as well as monovalent salts. Accordingly, the viscous liquid which is injected into the formation may contain, e.g., at least 2% by weight of salt. More particularly, a relatively high salinity formation brine may be used as at least part of the water used to form the viscous liquid. This viscous liquid can be injected into formations containing therein relatively high salinity formation brines, e.g., containing divalent ions such as $Ca^{2+}$ and $Mg^{2+}$ as well as monovalent ions such as $Na^{+}$.

The injection of viscous complexed biopolymer slugs, which serve as plugging agents or slowly moving flow barriers in high permeability streaks and established water channels, contributes to improved waterflood conformance.

The complexed biopolymer solutions are shear-thinning and this property has been exploited in the placement of the slug, aided by the pressure gradient around the injection wells. FIG. 1 shows how the typical slug viscosity decreases with increasing shear rate or flow velocity. Around an injector, the flow rate and the associated pressure gradient are at a maximum; they drop off rapidly with radial distance from the wellbore (FIG. 2). Thus, as the injected biopolymer solution flows outward, its apparent viscosity will be initially low and hence the slug can be readily injected. At a location sufficiently far away, say, 30 feet, the flow rate and pressure gradient are much reduced and the viscosity returns to its low-shear high value. This increased viscosity arrests, and in some instances, stops altogether the movement of the slug.

The complexing of the biopolymers also results in increased particle size, thereby minimizing the penetration of the polymer aggregates into the tighter reservoir layers. The combination of these factors and the shear-thinning effects provide a selective placement of viscous slugs into the thief zones.

The injected fluid will be proportioned into the various reservoir strata according to their effective permeabilities and flow capacities. The blocking of the most permeable flow channels leads to the diversion of the following floodwater to the under-swept portions of the reservoir and, in turn, to improved oil recovery.

The following Examples demonstrate various aspects of the use of the complexed biopolymers. The simulation studies of Example 1 are at least partially derived from observations made in actual field tests. Examples 2 and 3 pertain to actual field tests.

EXAMPLE 1

Simulation Studies

A. Theoretical Analysis—The beneficial effects of stratification control by complexed biopolymers are illustrated by the following idealized cases:

Case 1: The reservoir consists of three noncommunicating layers with horizontal permeabilities (k) of 5, 1000, and 25 millidarcies and thicknesses (h) of 30, 5 and 20 feet, respectively. The fraction of the injected floodwater entering into the $i^{th}$ layer ($q_i$) is:

$$q_i = k_i h_i / \sum_{i=1}^{3} k_i h_i$$

As indicated in FIG. 3, the injection profile is highly disparate. The central zone constitutes only 9% of the net pay, yet it receives 88.5% of the injected water. This uneven fluid distribution leads to early breakthrough, high water cut, and underflooding of the upper and lower layers.

Suppose a viscous slug of complexed biopolymer solution were employed to seal off partially the middle thief zone. Suppose further that the effective permeability of this layer were reduced by a factor of ten to 100 millidarcies to a distance of 27 feet from the injector. The resulting fractional flow profile would be substantially improved. FIG. 3 shows the results obtained, using a simulation model, from initiating a waterflood in a 10 acre, normal 5 spot at a rate of 1000 barrels per day. The same injection rate was maintained before and after polymer treatment. The second zone now receives only 54.9% rather than 88.5% of the water and the combined fractional flow into the other reservoir regions increases from 11.5% to 36.1%.

Case 2: The detrimental effects of reservoir stratification are magnified by changes in the oil and water relative permeabilities as waterflooding progresses. Consider again the reservoir described in the last section and further assume that the porosity (o) is 20% and the initial oil saturation ($S_o$) is 65%. As secondary operation proceeds, the high permeability middle layer takes most of the injected water and therefore, its oil saturation decreases rapidly. This reduction increases the relative permeability to water, causing this layer to receive an even greater proportion of the flood. The net consequence is an accelerated rise in the water to oil ratio (WOR) at the production wells and a deterioration of oil recovery from the tight layers.

FIG. 4 shows that after 800 days of waterflooding, the fractional flows and oil saturations for the reservoir layers are (1.1%, 93.6%, 5.3%) and (64.3%, 33.0%, 61.0%), respectively. It is clear that the most permeable zone has been essentially flooded out while the other two stay relatively untouched.

Reducing the effective permeability of this thief zone by a factor of ten to a distance of 27 feet from the wellbore as before greatly improves the injection profile and oil displacement. The corresponding flow and oil distribution are now (7.0%, 59.2%, 33.7%) and (58.7%, 30.0%, 45.0%) after 1200 additional days of waterflooding. The flood performance is greatly improved. FIG. 5A portrays the oil production rate as a function of time. It is interesting to note that the response to polymer injection is almost immediate.

Case 3: This case examines the effects of both intra and interlayer communication. In addition to the model parameters described above, it is assumed moreover that the ratio of the vertical to horizontal permeabilities within a reservoir layer is 0.1 and that the effective permeabilities for the adjoining zones can be satisfactorily characterized by their harmonically averaged values. The results are presented in FIG. 5B. The oil production increase following polymer treatment is delayed considerably and is much less striking than that for Case 2. This delay and reduced level of response are caused by the displaced oil having to flow from the low permeability strata into the central, nearly flooded-out zone before reaching the production wells. Of course, the effects of inter-zonal communication will be minimized by more efficient permeability reduction and more in-depth treatment by the polymers.

Figure 6:
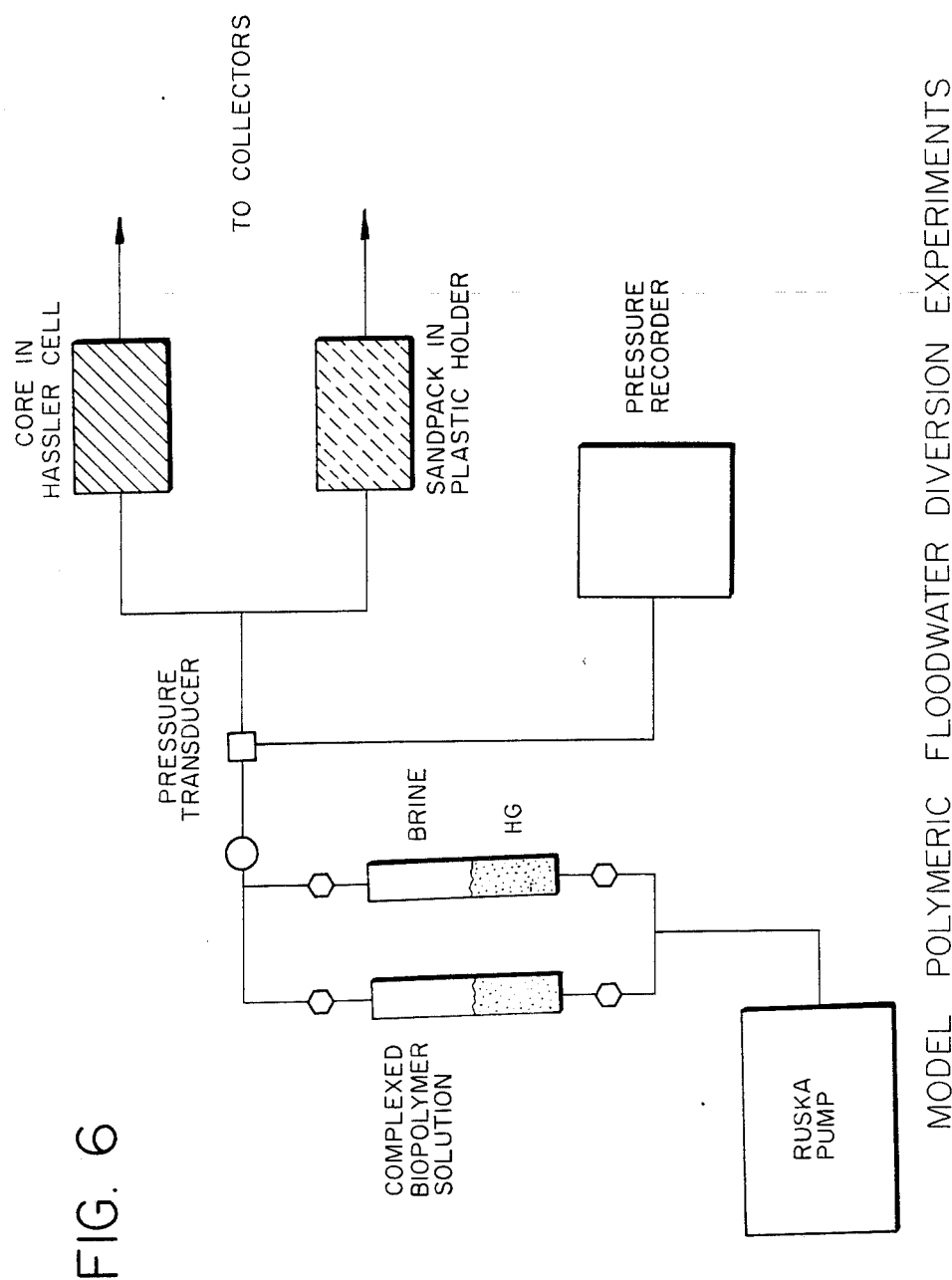
FIG. 6 shows a schematic representation of experimental equipment used in model polymeric floodwater diversion experiments discussed in Example 1.

B. Model Polymeric Floodwater Diversion Experiments—Demonstration of flow profile modifications in model stratified systems using complexed biopolymers has been made. In these studies, a high permeability pack of oolite and Berea sands was connected in parallel with a carbonate reservoir core of much lower permeability; the cross-sectional areas of the pack and the core were comparable. Solutions containing 2,000 ppm of polysaccharides complexed with 40 ppm of chromium ions in a 7% TDS brine were used for floodwater diversion at 50° C. A schematic representation of the experimental equipment is given in FIG. 6.

Case 1: The respective pore volumes and brine permeabilities of the pack and core were (8.6 cm$^3$, 6.6 cm$^3$) and (10,000 md, 8.1 md). A 50% PV slug of complexed biopolymer solution was injected into the sandpack. The pack was then connected in parallel with the core and waterflooding was then resumed. Before polymer treatment, the relative ratio of the flow rates for the pack and the core was 1235 (10,000/8.1). Following treatment, this ratio became 0.03 at 0.1 PV of waterflooding, 0.8 at 1 PV and 1.4 at 10 PV. Thus, floodwater was effectively diverted from the pack to the core. This situation is akin to diversion of floodwater from the thief zones to the tighter regions of the reservoir. It is interesting that the effects persisted even after 10 PV of flooding.

Case 2: This experiment was essentially identical to Case 1 except that polymer treatment was effected with the pack and core already connected in parallel. The purpose was to examine the selectivity of polymer placement and its effect on floodwater diversion. Prior to polymer injection, the flow rate into the pack was 1420 times that of the core. Polymer treatment led to a reduction of the ratio of 1.6 at 0.1 PV of waterflooding, 40 at 1 PV, and 45 at 10 PV. The efficiency therefore was lower than that of the previous case. Post-test examination of the core indicated that its brine permeability had remained unchanged, i.e., no appreciable polymer penetration into the core had occurred. Apparently, the poorer placement selectivity was the result of a part of the injected polymer solution's staying near the core entrance and offering increased resistance to the flow of the trailing floodwater. Nevertheless, in some field situations, specific placement of the polymer solution into the offending zones, say, through the use of mechanical packers, may be more desirable than injecting the solution downhole and letting it proportion into the reservoir strata naturally.

EXAMPLE 2

Field Test

The producing horizons in this field include rocks from the Permian, Pennsylvanian, Mississippian, and Ordovician Ages. Underlying the subject lease and the surrounding area are several Permian sands capable of oil and gas producton, the principal ones occurring at approximate depths of 400 and 650 feet. Electric logs and core analysis had indicated that the more than 50 feet of pay are characterized by large permeability and porosity contrasts, thus making them prime candidates for complexed biopolymer treatment.

Primary production from the Permian sand had resulted from solution gas drive, aided later by gravity drainage. Waterflooding was initiated in 1962 to arrest the decline in the oil rate. Due to reservoir stratification, the effects of which are magnified by the moderately high oil viscosity (40 cp), the efficiency of the flood had been disappointingly low. Of the 9.4 million barrels of original oil in place, the total primary and secondary recovery amounted to only 1.5 million barrels. The remaining reserves were estimated to be 597,000 barrels at the start of the current biopolymer well treatment program.

The field presently has 12 water injectors and 37 oil producers over a 160-acre lease. Including the inactive wells, the average well spacing is 2.5 acres. The polymer enhanced waterflooding operation was divided into two phases—the first consisting of four wells, the second, eight. The duration of polymer injection was 22 and 29 days, respectively. Pfizer biopolymer broths of 2.5–4.3% active concentrations were employed in both phases; they were diluted with field water to 4,000 ppm and complexed with 60 ppm of chromium ions as $CrCl_3.6H_2O$.

The resulting mixture, which also contained 600 ppm of formaldehyde to minimize long-term biodegradation, was further diluted 1:1 with field brine before final injection into the reservoir. The design of the plant, which has an injection capacity of 3,000 BPD, is conventional, involving a suitable assortment of storage and mixing tanks, pumps, meters, control valves, etc.

Upon completion of slug placement, regular waterflooding was resumed at about the same pre-test rate (average before polymer treatment=7247 BWPD, average after polymer treatment=7032 BWPD). The treatment designs were, in all cases, generally sufficient for the polymer solution to penetrate out to a radial distance of 25–30 feet from the wellbore. This dosage corresponded to an average polymer usage of 2,500 pounds per well. The viscosity of the injectant and its shear rate dependence are shown in FIG. 1.

Profile surveys were conducted before and after polymer treatment. The profile logs presented are conventional ones based on injecting iodine-131 and monitoring its radioactivity within the wellbore. The results are presented in FIG. 7. For Well 35, fluid flow distribution was significantly modified by the polymers, with the subsequent floodwater diverted entirely to a previously uninvaded zone. For Well 7, a similar alteration was effected; a new zone was "created" and the fractional flow into existing strata was differently distributed. Following polymer injection, Wells 50 and 53 both showed an increase in the number of zones receiving floodwater.

In view of the small size of the project, oil production response can be readily seen in the unit oil sale; for this reason, no detailed performance analysis of the individual offset producers had been made and the daily oil sale for the lease was used as the basis for evaluating the benefits of polymer treatment. A least square fit of this rate for the eleven months preceding polymer injection establishes the "best" production decline curve (FIG. 8). After project initiation, weekly averaged oil production rates were obtained. Because the reservoir was fluid-filled and the wells closely spaced, response was almost immediate, with production climbing from the pre-test level of 230 BOPD to over 300 BOPD within a month. An analogous response to the 8-well second phase treatment was noted. Production reached a peak of 326 BOPD before gradually declining. For the first 14.25 months that this project has been on stream, an estimated 36,406 barrels of incremental oil had been recovered. This is equivalent to 6.1% of the remaining waterflood reserves. The production rates have remained considerably above the baseline values and it cannot as yet be predicted what will be the ultimate recovery.

EXAMPLE 3

Field Test

The formation involved in this field test is located on a large faulted anticline. The zones include Fortuna, Noble Olson, and Basal Permian sands, all of which are of Permian Age. In descending order, these zones occur from 1,500 to 3,400 feet in depth. The Fortuna sands are lenticular, composed of numerous stringers in the 1,700–2,400 foot interval. The Noble Olson is a relatively continuous, very fine to fine grained sandstone. The lithology of the Basal Permian sand varies from cherty limestone to limey sandstone. In the staged development of this unit, some of the wells had been completed only to one or two of the sand members.

Even within a particular sand, e.g., the Fortuna, the various stringers were often flooded simultaneously by multi-zone injectors, resulting in premature watering out of the higher permeability strata and in underflooding the tighter layers.

Of the 13.2 million barrels of original oil in place in the 1,120-acre unit, 1.4 million barrels had been produced by primary means and 1.2 million barrels by waterflooding. The comparatively poor performance of the waterflood was attributable in large measure to the presence of multiple zones of widely varying permeability. At the beginning of this polymer project, the remaining secondary reserves were placed at 1.02 million barrels.

Like the project of Example 2, that of this Example was also separated into two phases. The preliminary phase was confined to a 316-acre central portion of the lease with 30 producers and 10 injectors, five of which were treated with Pfizer broth, the other five with a Kelco broth. The second, which was implemented six months later, comprised the remaining 13 injection wells and 44 production wells. Pfizer broths were selected for this expansion. The design and polymer blending followed identically those employed in Example 2. Also, the pre and post treatment water injection rates were kept roughly the same (average before polymer treatment = 12,384 BWPD; average after polymer treatment = 12,606 BWPD).

The test of this Example was an outgrowth of an earlier 4-well pilot in the southern end of the unit utilizing Kelzan, a solid polysaccharide product of the same molecular structure as those of the Pfizer and Kelco broths. This field trial demonstrated the applicability of the biopolymer floodwater diversion process to this reservoir in two ways. First, a clearly defined oil production response was noted, resulting from an injection of 35,800 pounds of complexed biopolymer and in a cumulative incremental oil recovery of some 28,400 barrels. Second, the profiles of all four injectors had been substantially changed. This was evident from radioactive tracer logs taken two weeks before and one week after Kelzan injection (FIG. 9). The survey of Well 1-4 reveals that the injected fluid entering the formation at the perforations below 2,050 feet was increased from 170 to 260 BWPD; water flow into the perforations just above 2,200 feet was reduced from 255 to 152 BWPD. For Well 209, the 467 BWPD injection was going into only three of the eight perforated zones but was subsequently re-distributed among seven intervals. For Well 2-13, the zones receiving water was reduced from four to three and the injection ratios were altered. Finally, four of the six zones perforated were taking water prior to polymer treatment; later, only three remained and their flow capacities were modified.

For the present project, the daily unit oil sale was again used as the basis for assessing the response to polymer injection. A least square analysis led to the following decline equation: $Log_{10} = 2.7392 - 0.006215\ t$, with t = month. Perhaps due to the larger 10-acre well spacing, incremental oil production, although equally as favorable as that of the Example 2 test, was somewhat delayed; it was observed about a month following polymer treatment. As shown in FIG. 10, there appeared to have been also a response to the initiation of the second project phase in August of year 2. As of April of year 3, the total incremental oil production was about 32,150 barrels. The tertiary oil recovery rate has shown little sign of declining.

A summary of reservoir and project data for Examples 2 and 3 are provided in Table I. Table II provides a summary of project performance for Examples 2 and 3.

TABLE I

| SUMMARY OF RESERVOIR AND PROJECT DATA | | |
|---|---|---|
| PROJECT | EXAMPLE 2 | EXAMPLE 3 |
| DEPTH, FEET | 400–650 | 1700–3400 |
| SALINITY, % TOS | 9 | 23 |
| GEOLOGICAL AGE | PERMIAN/ ORDOVICIAN | PERMIAN |
| LITHOLOGY | SANDSTONE | SANDSTONE |

TABLE I-continued
SUMMARY OF RESERVOIR AND PROJECT DATA

| PROJECT | EXAMPLE 2 | EXAMPLE 3 |
| --- | --- | --- |
| POROSITY, % | 20 | 17 |
| PERMEABILITY RANGE, MD | 0.1–2100 | 1–500 |
| AVERAGE PERMEABILITY MD | 138 | 15 |
| TEMPERATURE, °F., | 69 | 90 |
| OIL SATURATION, $S_o$, % | 50 | 40 |
| OIL VISCOSITY, CP | 40 | 7 |
| NET PAY, FEET | 70 | 50 |
| GRAVITY, °API | 29 | 35 |
| # INJECTORS | 12 | 23 |
| WELL SPACING | 2.5 | 10 |
| [$C_r^{+3}$], PPM | 30 | 20 |
| [POLYMER], PPM | 2000 | 2000 |
| POLYMER TYPE | PFIZER BROTH | PFIZER BROTH/ KELCO BROTH |
| BIOCIDE | FORMALDEHYDE | FORMALDEHYDE |
| BIOCIDE CONC., PPM | 300 | 300 |
| START OF WATERFLOOD | 1962 | 1967 |
| WATERFLOOD RESERVES, M BBLS | 597 | 1020 |

TABLE II
SUMMARY OF PROJECT PERFORMANCE

| PROJECT | POLYMER USAGE, THOUSAND LBS. | NUMBER OF WELLS TREATED | TIME ON STREAM, MONTHS | CUMULATIVE INCREMENTAL OIL, BBLS. |
| --- | --- | --- | --- | --- |
| EXAMPLE 2 | 30 | 12 | 14.25 | 36,406 |
| EXAMPLE 3 | 50 | 23 | 14.00 | 32,150 |

The results of the foregoing field tests are felt to demonstrate the very high degree of selectivity of placement of the complexed biopolymer in high permeability stratum or strata. In this regard, it is noted that the available pore space in the low permeability areas is quite limited. Accordingly, if even a small amount of complexed polymer were to enter the low permeability regions, these regions would become essentially completely plugged, thereby preventing the enhanced recovery of incremental oil.

As mentioned previously, the ability of the complexed polysaccharide to selectively enter the high permeability regions is felt to be associated with the shear-thinning capabilities of the complex. While not wishing to be bound by any particular theory or mode of action, this selective placement in high permeability regions is also felt to be, at least partially, a result of the uniformly large particle size of the polysaccharide complex. In this regard, it is noted that the microorganisms which produce these polysaccharides do so in an extremely uniform fashion such that relatively large polymers of a very narrow particle size distribution are produced exclusively. Complexing these polysaccharides effectively increases the particle size even further. The complexed polysaccharides are felt to be simply too big to fit in low permeability regions of stratified formations. By way of contrast, man-made polymers such as polyacrylamides characteristically have broad particle size distributions and include particles much smaller than polysaccharide particles. Complexes formed with such small particles may well be sufficiently small enough to enter into and block low permeability strata.

It is felt that the ability of complexed polysaccharides to remain viscous at relatively high salinities is associated with the relatively stiff polymeric backbones of these polymers. Consequently, the stiff polymeric backbones tend to prevent the polymer chains from coiling into small particles under the influence of cations. On the other hand, polyacrylamides have a flexible backbone which can coil under the influence of cations.

The polymeric backbones of polysaccharides are also felt to be more resistant to cleavage by breaking of covalent bonds under the influence of shearing forces than the polymeric backbones of polyacrylamides.

As referred to herein, the complexed polysaccharides are "disrupted" under the influence of shearing forces such that the complexing bonds are broken, partially broken, stretched or bent in order to effect a reduction in particle size or a change in particle morphology of the complex.

Particularly in view of the above discussion, an aspect of the present invention can be viewed as a means for accomplishing the following steps: (1) manufacturing uniformly large particles; (2) squeezing these particles into the formation by the action of shearing forces on the particles; and (3) permitting the particles to re-swell to their original size in high permeability strata. The particles are felt to be simply too big to be squeezed into the low permeability strata.

I claim:

1. A method for imparting superior viscosity to an aqueous polysaccharide B1459 solution wherein the aqueous component is hard water consisting of prehydrating the polysaccharide in fresh water before mixing with hard water.

2. A method as in claim 1 wherein the fresh water contains inorganic ions up to about 300 parts per million.

3. A method for imparting superior viscosity to an aqueous polysaccharide B-1459 solution consisting of prehydrating the polysaccharide in fresh water and mixing the prehydrated polysaccharide solution with hard water.

4. A method as in claim 3 wherein the final solution of polysaccharide has an aqueous component which is hard water.

5. A method as in claim 4 wherein the hard water has an inorganic ion content of 6 weight percent or more.

6. A method of imparting superior viscosity to an aqueous polysaccharide B-1459 solution wherein the aqueous component is hard water consisting of prehydrating the polysaccharide in distilled water before mixing with hard water.

7. A method for imparting superior viscosity to an aqueous polysaccharide B-1459 solution consisting of prehydrating the polysaccharide in distilled water and mixing the prehydrated polysaccharide solution with hard water.

8. In a method of preparing a viscous aqueous liquid for introduction into a well penetrating the earth, the method comprising:
(a) incorporating a water-dispersible polysaccharide produced by addition of bacteria of the genus Xanthomonas on a carbohydrate into an aqueous liquid having a salinity within the range of 0–0.03 weight percent,
(b) incorporating trivalent metal ions selected from the group consisting of aluminum, chromium, and iron ions into said aqueous liquid in a concentration sufficient to effect complexing of said polysaccharide,
(c) subsequent to steps (a) and (b), adding an aqueous saline makeup solution to said aqueous liquid containing said polysaccharide and said trivalent metal ions to increase the salinity thereof to a value of at least 0.5 weight percent, and
(d) thereafter introducing said aqueous liquid into said well.

9. The method of claim 8 further comprising the step of, subsequent to steps (a) and (b) and prior to step (c), incorporating a biocide into said aqueous liquid.

10. The method of claim 8 further comprising the step of, subsequent to steps (a) and (b) and prior to step (c), adding an aqueous solution of an alkaline agent into said aqueous liquid containing said polysaccharide and said trivalent metal ions.

11. The method of claim 8 wherein said trivalent metal ions are incorporated into said aqueous liquid by mixing an aqueous solution of said trivalent metal ions with said aqueous liquid.

12. The method of claim 8 wherein said trivalent metal ions comprise chromium ions.

13. The method of claim 8 wherein the concentration of said trivalent metal ions in said aqueous liquid at the conclusion of step (c) is no greater than 25 parts per million.

14. The method of claim 8 wherein said polysaccharide is a polysaccharide produced by action of the bacterium *Xanthomonas campestris.*

15. The method of claim 14 wherein said trivalent metal ions comprise chromium ions.

16. In a method of preparing a viscous aqueous liquid for introduction into a well penetrating the earth, the method comprising:
(a) incorporating a water-dispersible polysaccharide produced by action of the bacterium *Xanthomonas campestris* on a carbohydrate into an aqueous liquid having a salinity within the range of 0–0.03 weight percent,
(b) thereafter incorporating trivalent metal ions selected from the group consisting of aluminum, chromium, and iron ions into said aqueous liquid in a concentration sufficient to effect complexing of said polysaccharide,
(c) thereafter adding an aqueous saline makeup solution to said aqueous liquid containing said polysaccharide and said trivalent metal ions to increase the salinity thereof to a value of at least 0.5 weight percent, and
(d) thereafter introducing said aqueous liquid into said well.

17. The method of claim 16 wherein said trivalent metal ions comprise chromium ions.

18. The method of claim 17 further comprising the step of, subsequent to step (b) and prior to step (c), adding an alkaline agent to said aqueous liquid containing said polysaccharide and trivalent metal ions to increase the pH thereof and thereafter decreasing the pH of said aqueous liquid concomitantly with step (c).

19. The method of claim 18 wherein the salinity of said aqueous liquid is increased during step (c) to a value of at least 6 weight percent and wherein the pH of said aqueous liquid is decreased during step (c) to a value within the range of 5–7.5.

20. The method of claim 19 wherein the concentration of chromium ions in said aqueous liquid at the conclusion of step (c) is within the range of 4–25 parts per million.

21. In the production of oil from subterranean reservoirs by the waterflooding technique wherein an aqueous polysaccharide B-1459 solution is introduced into a well penetrating the earth, the improvement which comprises using an aqueous polysaccharide solution made by prehydrating the polysaccharide in fresh water and then mixing this prehydrated solution with hard water whereby said prehydration step yields a polysaccharide solution in hard water of higher viscosity than hydrating directly in hard water.

22. A method as in claim 21 wherein the fresh water contains inorganic ions in concentrations up to about 300 parts per million.

23. A method as in claim 21 in which the hard water has an inorganic ion content of 6 weight percent or more.

24. A method as in claim 21 in which trivalent metal ions selected from aluminum, chromium and iron ions are incorporated into the prehydrated solution before the hard water is mixed with it, the trivalent metal ions being used in a concentration sufficient to effect complexing of the polysaccharide.

25. A method as in claim 24 in which a biocide is incorporated into the solution before the hard water is added.

26. A method as in claim 24 in which an aqueous solution of an alkaline agent is incorporated into the solution before the hard water is added.

27. A method as in claim 24 in which the concentration of trivalent metal ions in the solution after the hard water is added is no greater than 25 parts per million.

28. In the production of oil from subterranean reservoirs by the waterflooding technique wherein an aqueous polysaccharide B-1459 solution is introduced into a well penetrating the earth, the improvement which comprises using an aqueous polysaccharide solution made by prehydrating the polysaccharide in distilled water and then mixing this prehydrated solution with hard water whereby said prehydration step yields a polysaccharide solution in hard water of higher viscosty than hydrating directly in hard water.

29. In the production of oil from a subterranean reservoir by the waterflooding technique in which an aqueous liquid comprising a polysaccharide produced by the action of bacteria of the genus Xanthomonas on a carbohydrate is introduced into a well penetrating the earth, the improvement which comprises:

using an aqueous polysaccharide solution made by prehydrating the polysaccharide in fresh water and then mixing this prehydrated solution with hard water, whereby the prehydration step yields a polysaccharide solution in hard water of higher viscosity than by hydrating directly in hard water.

30. A method according to claim 29 in which the polysaccharide is prehydrated in fresh water having a salinity of up to 0.03 weight percent and the polysaccharide solution in hard water has a salinity of at least 0.5 weight percent.

* * * * *